Aug. 29, 1961   F. H. INE   2,997,736
EVISCERATING DEVICE
Filed Feb. 27, 1958   2 Sheets-Sheet 1

INVENTOR.
Frank H. Ine
BY Townsend and Townsend
Attorneys

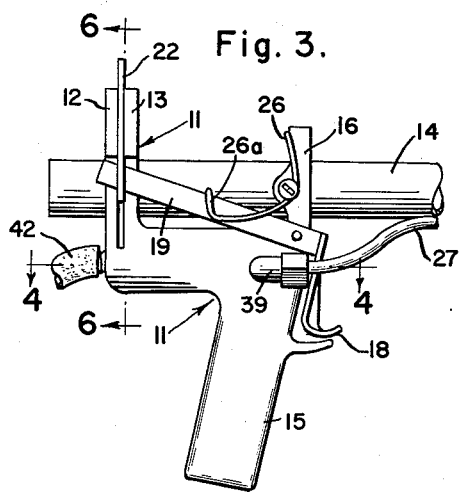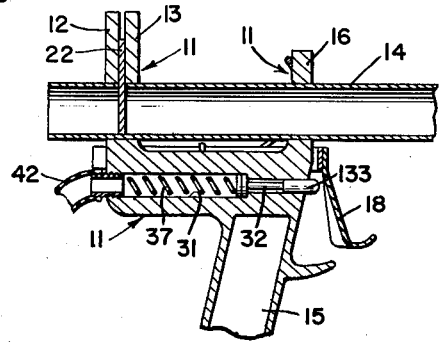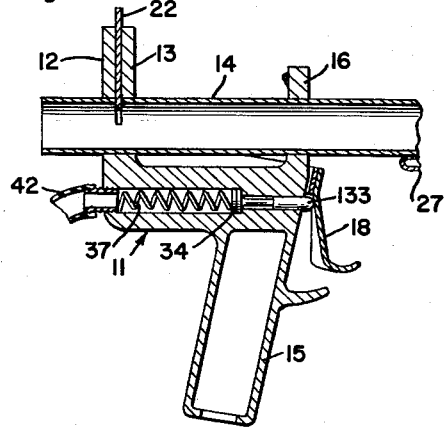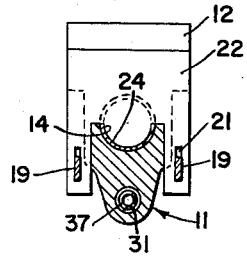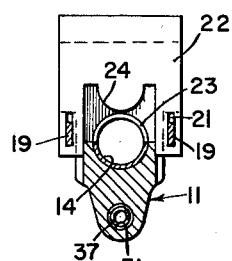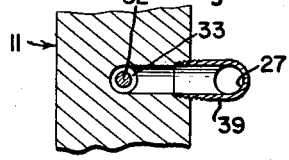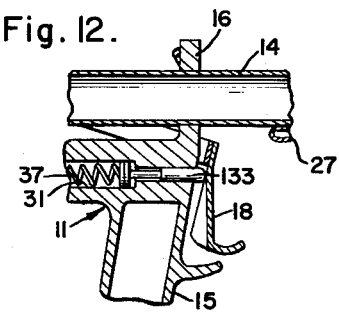

United States Patent Office 2,997,736
Patented Aug. 29, 1961

2,997,736
EVISCERATING DEVICE
Frank H. Ine, 2048 N. 31st St., Milwaukee, Wis.
Filed Feb. 27, 1958, Ser. No. 717,964
8 Claims. (Cl. 17—11)

This invention relates to a new and improved device and method for eviscerating poultry and the like. More particularly, the invention relates to the art of removing organs, such as kidneys and lungs, from the pleural cavity of animals, especially, foul, such as turkeys and chickens.

Reference is made to U.S. Patent No. 2,723,831, dated November 15, 1955, which discloses a vacuum nozzle valve useful in the removal of viscera, such as lungs, from poultry.

Although, it is quite feasible in many instances to remove lungs and other body organs from the pleural cavities of poultry under the influence of suction and mechanical manipulation as may be obtained utilizing a vacuum nozzle device of the type previously indicated in said prior patent, it is generally more difficult to remove kidneys employing similar techniques. In this connection, the kidneys of turkeys and chickens appear to be more firmly adhered to the walls of the body cavity by animal tissue than other organs, such as lungs and the like. As a consequence, it has been found difficult to rapidly and effectively remove kidneys utilizing only the force of suction in conjunction with mechanical manipulation obtainable using a vacuum nozzle device of the type mentioned.

It is a principal object and feature of the present invention to provide, in combination with a vacuum nozzle type instrument, means for directing a relatively high velocity fluid jet stream of air or water in such manner as to impinge against and rupture the animal tissue connecting the body organs with the walls of the pleural cavity while simultaneously subjecting the organ to suctional forces of the instrument. In the embodiments of the invention shown on the accompanying drawings, there is provided in conjunction with a suction tube having a sufficient diameter to envelop the body organ to be removed a fluid jet tube having a discharge nozzle of much smaller cross-section than the vacuum tube and disposed adjacent the periphery of the vacuum tube intake end in such manner as to direct a fluid stream of air or water against the tissue holding the body organs in the pleural cavity. In the exemplary embodiment, the action of the jet stream in striking or impinging against the organ itself is used to rupture the tissues adhering the organ to the body cavity, and thereby to loosen sufficiently to permit its withdrawal through the suction tube. In these latter cases and to effect the desired results, the high pressure stream is directed more or less toward the center of the vacuum tube intake end.

In one embodiment of the invention to be described herein in more detail, there is provided a hand actuated trigger grip mechanism that is operable to cause simultaneous opening of both the vacuum valve and the valve mechanism that controls the discharge of fluid under pressure through the jet tube. In a second embodiment of the invention to be described herein, the trigger mechanism is operable to sequentially first open the vacuum valve and then open the valve mechanism controlling the fluid through the jet tube.

Other objects and advantages of the invention will become apparent upon reading the following specification and referring to the accompanying drawings in which similar characters of reference represent corresponding parts in the several views.

In the drawings:

FIG. 3 is a fragmentary side elevational view of the unit showing the parts in a second condition of operation;

FIG. 5 is an enlarged fragmentary view taken substantially on line 5—5 of FIG. 4;

FIG. 6 is a sectional view taken substantially on line 6—6 of FIG. 3 and showing the vacuum control valve in open condition;

FIG. 7 is the same as FIG. 6 but showing the valve assembly in closed condition;

FIG. 10 is a fragmentary longitudinal sectional view of a modified embodiment of the invention showing certain parts in a first condition of operation;

FIG. 11 is the same as FIG. 10 showing the parts in a second condition of operation;

FIG. 12 is a fragmentary view of FIG. 11 showing the parts in a third condition of operation.

Figure 1:
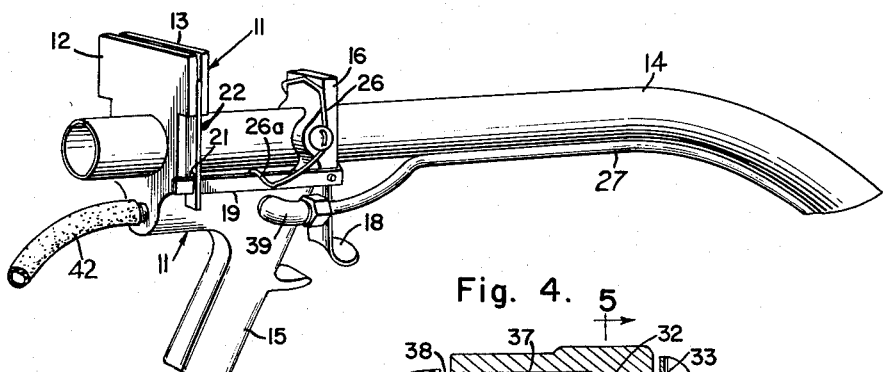
FIG. 1 is a perspective view of an embodiment of the invention.

The vacuum nozzle valve component of the instant invention may be constructed generally in accordance with the disclosure of my prior U.S. Patent No. 2,723,831, dated November 15, 1955, with perhaps only certain details of construction varied in accordance with practical design or engineering considerations. More specifically, the vacuum tube and valve component shown in the annexed drawings includes a body portion, indicated generally at 11, and comprising a pair of spaced vertical plates 12 and 13 formed with registering circular apertures snugly receiving and supporting the outer circumference of vacuum tube 14 projected through the apertures. The body member comprises also a front supporting plate 16 likewise apertured and circumferentially embracing and supporting the outer circumference of the vacuum tube 14. The body 11 includes further a portion housing a valve assembly indicated generally at 17 (to be described hereinafter in more detail) and a depending grip 15 which may be conveniently contacted by the hand and fingers of an operator. The forward end of the body supports a hingedly mounted trigger 18 which can be actuated by hand pressure rearwardly toward the grip 15.

A pair of rearwardly extending levers 19 are formed integrally with the trigger 18. The rearward extremities of levers 19 are pivotally slidably projected through slots 21 formed in opposite sides of vacuum gate valve 22, which, in turn, is slidably mounted for relative upward and downward reciprocation between plates 12 and 13. Tube 14 is formed with a transverse slot 23 in vertical registry with the space between plates 12 and 13. The semi-circular valve element portion 24 of the gate valve 22, being complementally shaped with reference to the interior circumference of the vacuum tube, can slidably move within slot 23 to effectively block off air passage through the said tube 14. A wire spring 26 mounted on front supporting plate 16 is provided with rearward extremities 26a engaged with and biasing downwardly levers 19 to normally maintain the gate valve 22 spring urged to closed position.

From the foregoing description it can be understood that when trigger 18 is squeezed inwardly toward grip 15, the rearward extremities of lever arms 19 will swing upwardly causing the gate valve 22, and particularly the semi-circular gate valve element 24 thereof, to raise out of registry from the interior passage of tube 14. In normal operation, the rearward terminus 14a of the tube will be connected to a suitable vacuum source (not shown), so that when the gate valve 22 is swung upwardly from its closed position as indicated in FIG. 7 to its open position as shown in FIG. 6, vacuum communication is established from the source to the forward or intake end 14b of the tube.

The present invention provides in conjunction with a vacuum tube assembly, preferably of the type hereinabove described, a jet tube or nozzle such as indicated at 27, and which is adapted to discharge a relatively high velocity stream of fluid, such as air or water, adjacent the intake end of the vacuum tube. As will more fully appear in the exemplary embodiment, the axis of the discharge end 27a of the jet nozzle 27 is angularly disposed relative to the axis of said tube 14 at its intake end 14a whereby said nozzle 27 is arranged to direct the fluid jet stream from the periphery toward the center of the vacuum tube intake end.

The cross-section or diameter of the jet nozzle 27 is much smaller than the diameter of the vacuum tube so that the stream discharged from the tube is adapted to impinge with considerable localized force against a body organ (such as a kidney) to rupture and loosen the animal tissues adhering the organ to the body cavity of the animal. As previously indicated the intake end of the vacuum tube is, in operation, placed over the bodily organ to be removed, and the jet stream injected against the tissues adhering the organ to the body cavity is intended to assist in the rupturing and loosening of same.

It will be observed that the jet tube 27 may be affixed as by soldering or welding 28 to the underside of the vacuum tube 14, and in such relation, the jet tube 27 follows generally the curvatured contour of the vacuum tube 14. However, toward the forward or intake end extremities of the vacuum tube the latter is longitudinally slotted to permit the end of the tube 27 to be bent or curved inwardly toward the center axis of the vacuum tube. This permits the discharge end of the jet tube 27 to be axially pointed or directed inwardly so as to direct the high velocity fluid stream toward the center of the intake end of said vacuum tube as aforesaid. It is noted that the intake end 14b of tube 14 is bevelled defining an oblique angle relative to the tube axis, and that the jet nozzle discharge end is located adjacent the shorter or inner cut side 29 of the bevel. Arrow 27b indicates the approximate path of fluid flow from nozzle 27.

The valve mechanism for controlling the flow through the jet nozzle 27 has been heretofore indicated generally by the reference numeral 17.

Figure 4:
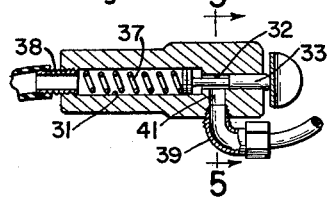
FIG. 4 is a view taken substantially on line 4—4 of FIG. 3.
Figure 2:
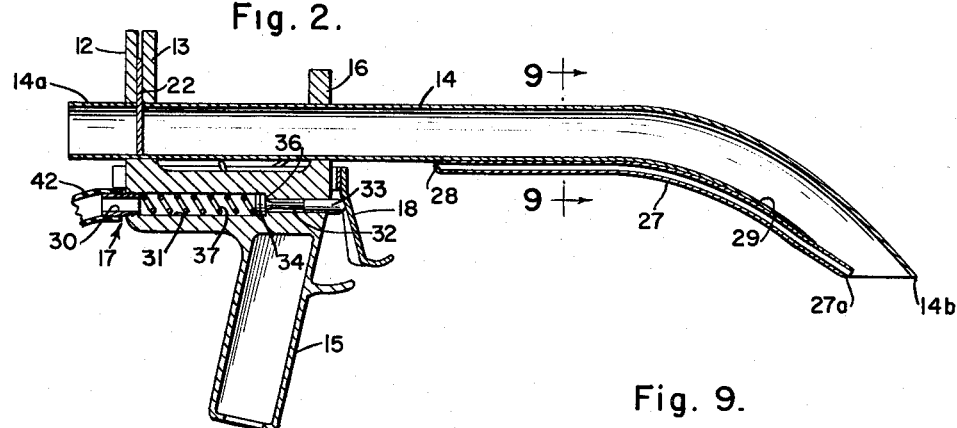
FIG. 2 is a longitudinal sectional view of one specific embodiment of the invention showing certain parts in one condition of operation.
Figure 9:
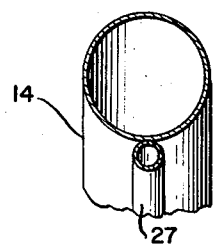
FIG. 9 is an enlarged sectional view taken on line 9—9 of FIG. 2.
Figure 8:
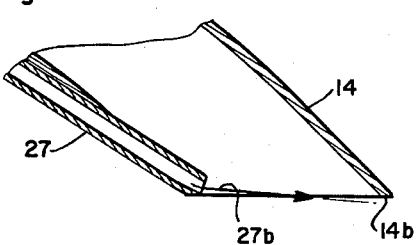
FIG. 8 is an enlarged sectional view of the intake end of the vacuum tube.

More specifically, assembly 17 as shown in FIGS. 2 and 4 as comprising a hose coupling or fitting 30, adapted to be connected to a suitable source (not shown) of air or water pressure by way of hose 42, threadedly fitted into an elongated passage 31 formed in the intermediate portion of body 11.

Passage 31 terminates in a valve chamber 32 of reduced diameter which slidably mounts the stem 33 of valve element or head 34. As shown in the drawings, valve head 34 is adapted to seat against the shoulder or seat 36 defined by the juncture between passage 31 and valve chamber 32. A valve spring 37 is mounted in passage 31 with its opposite ends abutting threaded nipple 30 and valve head 34 respectively to normally bias the latter into engagement with seat 36. The rearward extremities of tube 27 is connected by a suitable fitting or coupling 39 which, in turn, communicates via port 41 (formed through body 11) with the valve chamber 32.

The outer extremities of valve stem 33 project beyond the front surface of body 11 into contact with the inner face of trigger 18. In the embodiment shown in FIG. 2 the length of the valve stem 33 is such that the outer tip of the stem contacts the trigger 18 when the latter is in its maximum extended position. Hence, it will be understood that when the trigger 18 is squeezed toward the grip 15, the valve stem 33 and valve head 34 carried thereby will be thrust rearwardly causing the head to unseat from shoulder 36 and permitting the passage of fluid under pressure and at substantially high velocity from its source via tube 42, coupling 30, passage 31, chamber 32, port 41, fitting 39 and jet tube 27 to the discharge or nozzle end of the latter. It may be observed that the contraction of the trigger 18 will cause substantially simultaneous opening of the vacuum control valve 22 and the jet stream actuating valve 34—36. Consequently, the vacuum tube 14 will commence sucking air through its intake end 14b at about the same moment that high velocity fluid will be discharged toward the center thereof through the said jet nozzle 27.

FIGS. 10, 11 and 12 indicate a modified embodiment of the invention. The modification may be considered identical in all respects to the previously described device, except that the outwardly extended length of the valve stem 133 incorporated in the FIG. 10–12 embodiment is made substantially shorter than the extended length of previously described valve stem 33 shown in FIG. 2. Except for this distinction, corresponding components of the two illustrated embodiments are numbered identically in the drawings for purposes of convenient understanding and reference.

The purpose of making the extended length of valve stem 133 shorter than counterpart stem 33 of the previously described embodiment is to permit sequential, rather than simultaneous, actuation of the vacuum control valve and the jet stream control valve assembly. Thus, and as shown in FIG. 10, when the trigger 18 of the unit is in its maximum extended position as shown, it is seen that the outer extremity of the stem 133 is spaced a substantial distance inwardly from the said trigger. FIG. 11 illustrates that it is not until the trigger 18 has moved through a very substantial portion of its inward arcuate swing that valve stem 133 is contacted by it and thrust inwardly to cause unseating of the valve head 34. On the other hand this movement of the trigger will have caused the relatively long lever arms 19 to swing almost to their maximum upward positions and cause full opening of the vacuum tube gate valve 22 before the trigger contacts and actuates valve stem 133. It is appreciated that if the trigger 18 is moved only to the approximate position shown in FIG. 11 and maintained in such position, the device may be used as a vacuum tube without actuating the jet stream valve control assembly at all. However, upon further rearward movement of the trigger (as illustrated in FIG. 12) the valve stem 133 will be contacted and moved axially rearwardly against the force of spring 37 to cause unseating of the valve head 34. This latter said movement will establish flow communication through the jet tube 27 in the manner above explained.

As also noted earlier, it is contemplated that either air or water may be used as the jet fluid. By way of example, and not by way of specific limitation, air under 50–70 p.s.i. introduced through a 3/16" I.D. jet nozzle will suffice to assist greatly in the rupturing and loosening kidneys from the body cavities of turkeys and chickens. Water under pressure of 40–60 p.s.i. discharged through a tube of similar cross-section will also satisfactorily accomplish the same objectives.

Although the present invention has been described in some detail by way of illustration and example for purposes of clarity and understanding, it is appreciated that certain changes and modifications may be made within the spirit of the invention and the scope of the claims appended hereto.

I claim:

1. An eviscerating device for removing lung, kidneys and like organs from a body cavity: the combination of a suction tube having an open intake end of sufficient diameter to envelope the organ to be removed and, a fluid jet tube having a discharge nozzle of much smaller diameter than said suction tube intake end disposed adjacent the periphery of said suction tube intake end; the axis of said jet nozzle angularly disposed relative to the axis of said tube at its intake end to direct a fluid jet stream from the periphery toward the center of said vacuum tube intake end.

2. The combination of claim 1 and wherein said suction tube intake end is bevelled in a plane defining an oblique angle relative to the longitudinal axis of said vacuum tube; said jet nozzle located adjacent the shorter cut side of said bevel.

3. An eviscerating tool comprising in combination: a tool body supporting an air suction tube having an open intake end; said body supporting a control valve assembly for opening and closing vacuum communication to said tube; a fluid jet nozzle mounted with its discharge end adjacent the intake end of said suction tube with the axis of said jet nozzle angularly disposed relative to the axis of said tube at its discharge end to discharge a high velocity fluid stream from adjacent the periphery of said tube intake end toward the center thereof; a valve mechanism mounted on said tool body for opening and closing jet stream flow to said nozzle; and a single manual operating means mounted on said body operable to open and close both said vacuum control valve assembly and said valve mechanism.

4. The combination of claim 3 and wherein said last named means is operable to open and close said valve assembly and said valve mechanism simultaneously.

5. The combination of claim 3 and wherein said last named means is operable on partial actuation to open only said valve assembly and on full actuation to open also said valve mechanism.

6. An eviscerating tool comprising in combination: a tool body supporting an air suction tube having an open intake end; said body supporting a control valve assembly for opening and closing vacuum communication to said tube; a fluid jet nozzle mounted with its discharge end adjacent the intake end of said suction tube and axially disposed to discharge a high velocity fluid stream from adjacent the periphery of said tube intake end toward the center thereof; a valve mechanism mounted on said tool body for opening and closing jet stream flow to said nozzle; said valve mechanism including a valve stem projecting slidably reciprocably from said body movable from an extended position closing said valve mechanism to a retracted position opening said valve mechanism; a manually operable trigger mounted for relative movement toward and away from said body to respective adjacent and remote positions relative to said body; means connecting said trigger with said control valve assembly operable to open the latter upon movement of said trigger toward said body; the outer end of said valve stem disposed in the path of movement of said trigger; said trigger, upon being moved from its remote to its adjacent position relative to said body, operable to contact and retract the outer end of said valve stem and cause opening of said valve mechanism.

7. The combination of claim 6 and wherein the outer end of said valve stem in maximum extended position is normally biased into contact with said trigger when the latter is in maximum remote position relative to said body, whereby movement of said trigger toward said body will cause simultaneous opening of both said control valve assembly and said valve mechanism.

8. The combination of claim 6 and wherein the outer end of said valve stem in maximum extended position is disposed inwardly spaced from and out of contact with said trigger when the latter is in maximum remote position relative to said body, whereby movement of said trigger from its remote position toward said body will cause opening of said control valve assembly prior to opening of said valve mechanism.

References Cited in the file of this patent

UNITED STATES PATENTS

| | | |
|---|---|---|
| 2,107,732 | Gustafsson et al. | Feb. 8, 1938 |
| 2,605,496 | Spang | Aug. 5, 1952 |
| 2,613,391 | Still | Oct. 14, 1952 |
| 2,723,831 | Ine | Nov. 15, 1955 |
| 2,753,212 | Aultman | July 3, 1956 |
| 2,795,817 | Dahlberg | June 18, 1957 |
| 2,818,599 | Howe | Jan. 7, 1958 |

FOREIGN PATENTS

| | | |
|---|---|---|
| 614,582 | Great Britain | Dec. 17, 1948 |
| 634,244 | Great Britain | Mar. 15, 1950 |